Patented Aug. 24, 1937

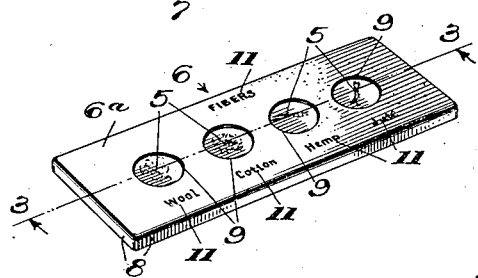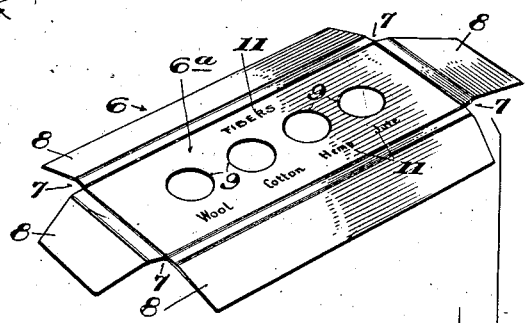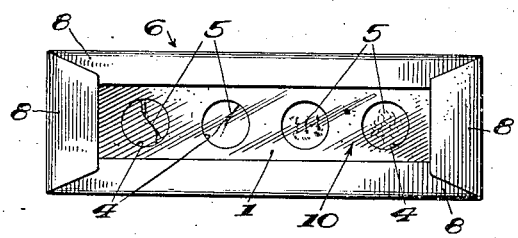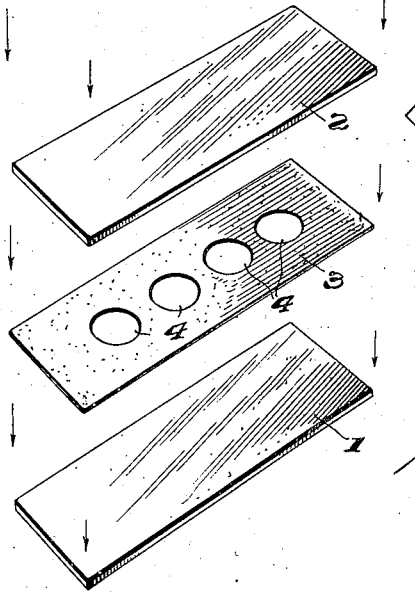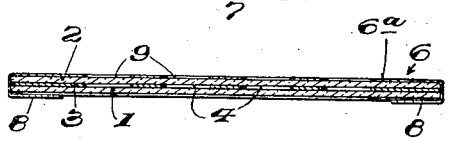

2,090,914

UNITED STATES PATENT OFFICE 2,090,914

MICROSCOPE SLIDE

Harold M. Porter, Hagerstown, Md., assignor to The Porter Chemical Company, Hagerstown, Md., a corporation of Maryland Application April 17, 1934, Serial No. 721,039

8 Claims. (Cl. 88—40)

This invention relates to microscope slides for use in mounting and preserving objects or specimens so that they can be conveniently handled and displayed or viewed through a microscope or the like.

Microscope slides have heretofore generally comprised a glass base plate or slip, usually rectangular in shape, for receiving the object or specimen to be displayed. In order to protect the object or specimen and hold it in place, it was usually covered with either a square or round piece of glass, known as a cover glass, the cover glass usually being attached to the glass base plate or slip by means of adhesive applied adjacent its edges. The specimen or object was usually mounted at one end of the slip or slide so as to leave room at the other end for attachment of a label on which descriptive matter identifying the specimen or object was placed.

This construction, although it has been standard practice for many years, is objectionable because it does not efficiently use the space provided and is, therefore, relatively expensive. Furthermore, the specimens or objects cannot be mounted very quickly and this also adds to the expense. This item of expense is a very important matter not only in connection with the mounting of objects or specimens for use in scientific research work, but more particularly in connection with what might be termed amateur microscopy which has recently become very popular. The above-described construction is also objectionable because the cover glass projects above or covers only a portion of the glass base plate or slip and this arrangement is not only lacking in neatness, but it makes stacking of the slides impracticable due to danger of breaking or displacing the cover glass.

An object of the present invention is to overcome the objections noted and to provide a microscope slide which will be simple, compact, neat and inexpensive and which will make it possible to mount objects or specimens quickly without requiring any particular degree of skill in doing so.

Other objects and novel features and advantages of the invention will become apparent from the following description taken in conjunction with the accompanying drawing which illustrates one practical form of device embodying the invention, it being understood that the description of this embodiment is merely illustrative and not restrictive.

In the drawing:

Fig. 1 is a perspective view of a microscope slide embodying the invention,

Fig. 2 is a bottom plan view,

Fig. 3 is a longitudinal sectional view of the line 3—3 of Fig. 1, and

Fig. 4 is a perspective view of the component parts previous to assembly.

Referring to the drawing, 1 indicates a base plate or slip of glass or similar transparent material, preferably rectangular in shape, upon which is mounted a similar plate or cover glass 2, both plates being of substantially the same size or contour. Mounted between plates 1 and 2 is a plate or spacing member 3, preferably of some opaque sheet material such as paper, cardboard or the like. Plate or spacing member 3, which is of substantially the same size or contour as plates 1 and 2, is provided with a plurality of symmetrically arranged holes or openings 4 which cooperate with plates 1 and 2 to provide a plurality of cells for receiving and displaying objects or specimens 5 which are held between the plates. Holes or openings 4 may be of any desired shape, those shown being circular in contour; and any desired number may be used depending somewhat upon the size of the spacing member, the spacing member being provided with four holes or openings in the present instance.

After the parts are assembled as described above, they are bound or held together by a cover member 6 formed of some opaque sheet material such as paper or the like. As best shown in Fig. 4, cover member 6 comprises a substantially rectangular sheet of paper or the like provided with notches or cut out portions 7 at the corners to form therebetween four tabs 8. The body portion 6ª of the cover member is provided with a plurality of holes or openings 9 which are adapted to register with the corresponding openings 4 in spacing member 3. When assembled as shown in Figs. 1-3, the body 6ª of cover member 6 covers or conceals the top or front side of the assembled plates, except for the holes or openings 9, which register with the corresponding holes or openings 4 in the spacing member; and the tabs 8 wrap around or envelop the sides, ends and a portion of the back of the assembled plates, leaving exposed a rectangular portion 10 at the back. As will be seen from Fig. 2, this exposed or uncovered portion 10 at the back of the assembled plates overlaps or extends over the openings 4 in the spacing member so that light can freely pass through these openings and the registering openings 9 in the cover member. Cover member 6 is attached to the plates 1 and 2 by any suitable adhesive.

Cover member 6 not only functions as a wrapper for holding the parts together and providing a neat finish, but it also acts as a label for carrying or displaying any suitable descriptive matter, as indicated at 11, for identifying or marking the objects or specimens displayed.

In assembling the parts of the slide, the base plate 1 and spacing member 3 are assembled or placed together so that their edges coincide. The objects or specimens 5 to be mounted or displayed are then placed in the openings 4 in the spacing member and the face plate or cover glass 2 is then placed on top of the spacing member 3 and bottom plate or slip 1, with its edges coinciding with the edges of the spacing member and bottom plate. For convenience in assembling these parts, one or both sides of spacing member or plate 3 are provided with a suitable adhesive to hold back and front plates 1 and 2 together. The cover member 6, provided with a suitable adhesive, is then applied with its body portion 6ª covering or concealing the front plate or cover glass 2, with holes or openings 9 in the cover member registering with the holes or openings 4 in the spacing member 3. Tabs or projections 8 of the cover member are wrapped around the sides, ends and a portion of the back of the assembled plates, the end tabs being preferably lapped over the side tabs as shown in Fig. 2, leaving exposed or uncovered a central rectangular portion 10 at the back of the assembled plates. As previously pointed out, this exposed portion or window 10, which is automatically formed in the process of wrapping or applying the cover member, overlaps or extends over the series of openings 4 in the spacing member so that light can freely pass through these openings and the registering openings 9 in the cover member.

Before applying the cover member 6 it is preferably provided with suitable descriptive matter, indicated at 11, for identifying or marking the objects or specimens displayed, care being used, of course, in applying the combined cover member and label 6 to associate the proper descriptive matter with the object or specimen to which it relates.

It will be seen from the foregoing that I have provided a very simple, compact and attractive microscope slide which is inexpensive not only because the space provided is efficiently used, but also because a maximum number of objects or specimens can be mounted with a minimum amount of time and effort. Not only is the slide very neat-appearing, with all the surfaces smooth, but due to the fact that all of the edges of the plates coincide, these plates and the objects or specimens supported thereby are firmly held against displacement. In practice, the cover member is usually made of gilded or colored paper and this adds to the attractiveness of the slide. Furthermore, in view of the fact that the edges of the plates 1 and 2 are wrapped or bound by the cover member, these edges need not be ground, thus saving additional expense.

It is to be understood that the invention is not limited to the exact arrangements shown and described and that various modifications can be made without departing from the spirit and scope of the invention as defined in the appended claims. For instance, in some cases, within the broad scope of the invention, the spacing member may be omitted, and the parts can be assembled in other ways from that described.

What is claimed is:

1. A microscope slide comprising two transparent rigid plates, and a cover member formed of opaque sheet material connecting said plates and holding them together, said cover member having a front cover portion, back cover portions and connecting portions extending between said front and back cover portions, said front cover portion covering the front and said back cover portions covering a portion of the back of said plates but leaving uncovered a back portion thereof between the opposed spaced terminals of the back cover portions, the front portion of said cover member being provided with an opening which cooperates with the uncovered back portion to display an object supported by and between said plates.

2. A microscope slide comprising two transparent rigid plates, an opaque spacing member therebetween provided with an opening to display an object supported by and between said plates, and a cover member formed of opaque sheet material connecting said plates and holding them together, said cover member having a front cover portion, back cover portions and connecting portions extending between said front and back cover portions, said front cover portion covering the front and said back cover portions covering a portion of the back of said plates but leaving uncovered a back portion thereof between the opposed spaced terminals of the back cover portions, the front portion of said cover member being provided with an opening which registers with the opening in said spacing member and said openings cooperating with the uncovered back portion whereby said object is visible through the registering openings in said cover and spacing members.

3. A microscope slide comprising two transparent rigid plates, and a cover member formed of opaque sheet material enveloping said plates and holding them together, said cover member covering the front, sides, ends and a portion of the back of said plates but leaving uncovered a back portion thereof, the front portion of said cover member being provided with an opening which cooperates with the uncovered back portion to display an object supported by and between said plates.

4. A microscope slide comprising two transparent rigid plates, an opaque spacing member therebetween provided with an opening to display an object supported by and between said plates, and a cover member formed of opaque sheet material enveloping said plates and holding them together, said cover member covering the front, sides, ends and a portion of the back of said plates but leaving uncovered a back portion thereof, the front portion of said cover member being provided with an opening which registers with the opening in said spacing member whereby said object is visible through the registering openings in said cover and spacing members.

5. A microscope slide comprising two transparent rigid plates, an opaque spacing member therebetween provided with a plurality of openings to display objects supported by and between said plates, and a cover member formed of opaque sheet material enveloping said plates and holding them together, said cover member covering the front, sides, ends and a portion of the back of said plates but leaving uncovered a back portion which overlaps said openings in said spacing member, the front portion of said cover member being provided with a plurality of openings which register with the openings in said spacing member whereby said objects are visible through said registering openings.

6. A microscope slide comprising two transparent rigid rectangular plates, an opaque rectangular spacing member therebetween provided with a plurality of openings to display objects supported by and between said plates, said plates and spacing member being of substantially the same size, and a cover member formed of opaque sheet material enveloping said plates and holding them together, said cover member covering the front, sides, ends and a portion of the back of said plates but leaving uncovered a rectangular back portion which overlaps said openings in said spacing member, the front portion of said cover member being provided with a plurality of openings which register with the openings in said spacing member whereby said objects are visible through said registering openings.

7. A microscope slide comprising two transparent rectangular glass plates, an opaque rectangular spacing plate therebetween provided with a plurality of openings to display objects supported by and between said plates, said plates being of substantially the same size, and a cover member formed of opaque sheet material enveloping said plates and holding them together, said cover member covering the front, sides, ends and a portion of the back of said plates but leaving uncovered a rectangular back portion which overlaps said openings in said spacing plate, the front portion of said cover member being provided with a plurality of openings which register with the openings in said spacing plate whereby said objects are visible through said registering openings and the front of said spacing plate is rendered invisible.

8. A miscroscope slide comprising two transparent rectangular glass plates, a rectangular spacing plate therebetween formed of thin opaque sheet material and provided with a plurality of openings to display objects supported by and between said glass plates, said plates being of substantially the same size, and a rectangular cover member formed of opaque sheet material, provided with notched corners, enveloping said glass plates and secured thereto by adhesive to hold them together, said cover member covering and protecting the front, sides, ends and a portion of the back of said glass plates but leaving uncovered a rectangular back portion which overlaps said openings in said spacing plate, the front portion of said cover member being provided with a plurality of openings which register with the openings in said spacing plate whereby said objects are visible through said registering openings and the front of said spacing plate is rendered invisible.

HAROLD M. PORTER.